US010761520B1

(12) United States Patent
Boone et al.

(10) Patent No.: US 10,761,520 B1
(45) Date of Patent: Sep. 1, 2020

(54) CLUSTER-BASED WORK CELL ORCHESTRATOR

(71) Applicant: Amazon Technologies, Inc., Seattle, WA (US)

(72) Inventors: Stephen Boone, Windham, MA (US); Joshua Davis, Medford, MA (US); Matthew Faso, Stow, MA (US); Cameron Fulford, Westford, MA (US); Deepanker Kocheta, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 15/950,624

(22) Filed: Apr. 11, 2018

(51) Int. Cl.
*G05B 19/418* (2006.01)
*B25J 9/16* (2006.01)
*B25J 9/00* (2006.01)
*B25J 13/00* (2006.01)

(52) U.S. Cl.
CPC ........ *G05B 19/4188* (2013.01); *B25J 9/0084* (2013.01); *B25J 9/1602* (2013.01); *B25J 13/006* (2013.01); *G05B 2219/31076* (2013.01); *Y10S 901/08* (2013.01)

(58) Field of Classification Search
CPC ....... G05B 19/4188; G05B 2219/31076; B25J 9/0084; B25J 9/1602; B25J 13/006; Y10S 901/08
See application file for complete search history.

(56) References Cited

U.S. PATENT DOCUMENTS

| 10,069,972 | B1 * | 9/2018 | Molander | ........... H04M 3/5133 |
| 2017/0026464 | A1 * | 1/2017 | Veeravarapu | ....... H04L 67/1012 |
| 2018/0253080 | A1 * | 9/2018 | Meess | ................ G05B 19/4099 |

* cited by examiner

*Primary Examiner* — Thomas C Lee
*Assistant Examiner* — Charles Cai
(74) *Attorney, Agent, or Firm* — Patterson + Sheridan, LLP (57) ABSTRACT

Embodiments herein describe forming clusters of network connected orchestration components (referred to herein as "orchestrators") and distributing the management of a plurality of work cells among the orchestrators. That is, each cluster can include a plurality of work cell orchestration nodes which are the compute resources used to host an orchestrator for managing the work cells. Each cluster can be assigned to manage a particular type or version of a work cell. Because managing a work cell may use only a small fraction of the compute resources of the orchestration nodes, each orchestration node can manage multiple work cells. The embodiments herein describe distributing the work cells amongst the orchestration nodes using a work cell table which permits the orchestration nodes to assert ownership over new work cells and enable automated failover in case one of the orchestration nodes fails.

19 Claims, 6 Drawing Sheets

NODE TABLE
215

| NODE ID | CLUSTER ID | HEARTBEAT TIMESTAMP |
|---|---|---|
| NODE 230A | CLUSTER 225A | 10:15:00 |
| NODE 230B | CLUSTER 225A | 10:15:03 |
| NODE 230C | CLUSTER 225B | 10:14:58 |
| NODE 230D | CLUSTER 225B | 10:15:01 |

FIG. 3

WORK CELL TABLE
220

| WORK CELL ID | CLUSTER ID | STATE | NODE ID | HEARTBEAT TIMESTAMP |
|---|---|---|---|---|
| WORK CELL 130A | CLUSTER 225A | ENABLED | NODE 230A | 10:15:00 |
| WORK CELL 130B | CLUSTER 225A | ENABLED | NODE 230B | 10:15:03 |
| WORK CELL 130C | CLUSTER 225B | ENABLED | NODE 230C | 10:14:58 |
| WORK CELL 130D | CLUSTER 225A | ENABLED | NODE 230A | 10:15:00 |
| WORK CELL 130E | CLUSTER 225B | ENABLED | NODE 230C | 10:14:58 |
| WORK CELL 130F | CLUSTER 225B | ENABLED | NODE 230D | 10:15:01 |

FIG. 8

CLUSTER-BASED WORK CELL ORCHESTRATOR

BACKGROUND

The present invention relates to assigning work cells to network connected orchestration components.

Industrial automation systems typically use a local controller in the form of a Programmable Logic Controller (PLC) or Industrial Personal Computer (IPC) that directly controls the automated machines involved in the automation (e.g., robotic arms, conveyance devices, labeling devices, etc.). These local controllers also receive direct input from sensing devices (presence sensors, barcode readers, vision systems, etc.). The sensors, the automated machine, and the local controller form a work cell. A facility or warehouse may include hundreds of work cells that perform a range of tasks.

As industrial automation systems become more advanced, it becomes beneficial to orchestrate these control systems from network connected orchestration components. That is, instead of most of the logic for operating the work cell being located in the local control component, the logic is moved to the network connected orchestration component which may provide a more user friendly software deployment interface. As the number of work cells increase, managing the assignment of the work cells to the network connected orchestration components becomes more difficult.

DETAILED DESCRIPTION

Embodiments herein describe forming clusters of network connected orchestration components (referred to herein as "orchestrators") and distributing the management of a plurality of work cells among the orchestrators. Each cluster can include a plurality of work cell orchestration nodes which are the compute resources used to host an orchestrator for managing the work cells. Each cluster can be assigned to manage a particular type or version of a work cell. Put differently, each orchestration node in a cluster manages the same type of work cell. For example, a first cluster may include orchestration nodes for managing work cells with conveyor belts while a second cluster includes orchestration nodes for managing work cells with robotic arms. In another example, the first cluster may include orchestration nodes which manage work cells using a particular version of an orchestration application while the second cluster includes orchestration nodes that manage work cells using an updated version of the orchestrator application.

Because managing (or orchestrating) a work cell may use only a small fraction of the compute resources of the orchestration nodes, each orchestration node can manage multiple work cells. Thus, a cluster of orchestration nodes can manage an even larger number of work cells (e.g., each orchestration node can manage fifty or more work cells). The embodiments herein describe techniques for distributing or assigning the work cells among the orchestration nodes using a node table and a work cell table. These tables permit the orchestration nodes to assert ownership over the work cells as well as assign new work cells and enable automated fail-over in case one of the orchestration nodes in the cluster fails.

Figure 1:
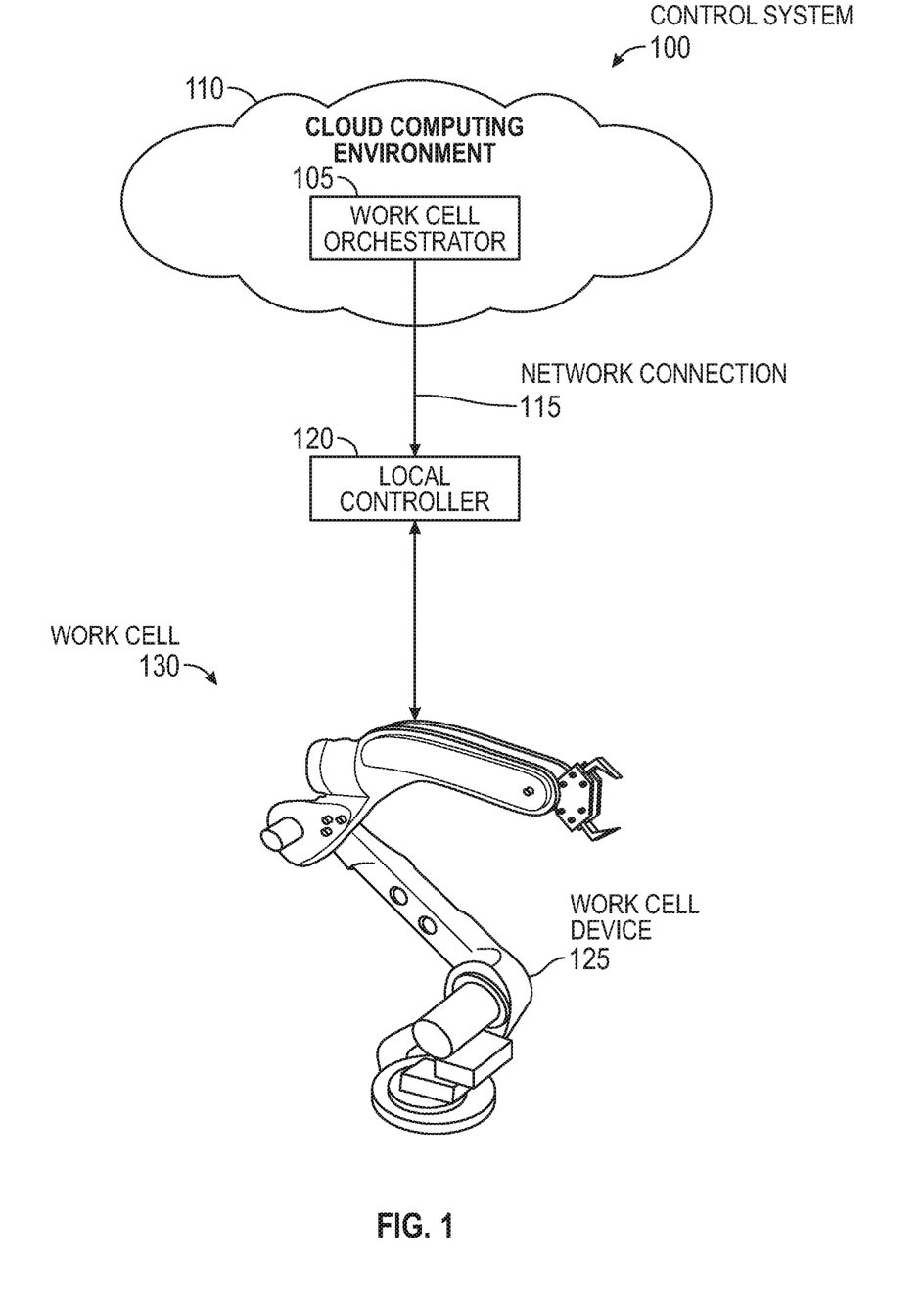
FIG. 1 illustrates a control system for controlling a work cell device using a remote work cell orchestrator, according to various embodiments.

FIG. 1 illustrates a control system 100 for controlling a work cell device 125 using a remote work cell orchestrator 105, according to various embodiments. As shown, the work cell orchestrator 105 (e.g., a network connected orchestration component) is communicatively coupled to a work cell 130 by a network connection 115. In this example, the orchestrator 105 is disposed in a cloud computing environment 110 (also referred to as "the cloud") and thus, can be referred to as a cloud-based orchestrator in this example. The cloud 110 can include a plurality of distributed computing resources which hosts or executes the orchestrator 105. In one embodiment, the cloud 110 includes compute resources that are remote from the work cell 130. For example, the work cell 130 may be disposed within a facility or warehouse while the cloud 110 is formed using remote data centers. As mentioned above, hosting the work cell orchestrator 105 in the cloud 110 may reduce cost since compute resources are less expensive than disposing compute resources at the physical location of the work cell 130. Further, the orchestrator 105 may be a software application deployment that is deployable using more advanced programming languages (e.g., C, C++, Java, etc.) than the programming language(s) used to configure a local controller 120 in the work cell 130. Because these advanced programming languages are more commonly known, there may be more people with the requisite skills to deploy and configure the orchestrator 105 when compared to the number of people who can configure the local controller 120 (e.g., a PLC or IPC). Further, by deploying the orchestrator 105 in the cloud 110, the orchestrator 105 may better integrate with other network-based services compared to the local controller 120.

In the control system 100, most of the logic for operating the work cell 130 is contained within the work cell orchestrator 105 rather than the local controller 120. Moving most of the logic to the orchestrator 105 results in the benefits recited above and enables the work cell 130 to perform more complicated automation algorithms.

In FIG. 1, the work cell device 125 includes a robotic arm that may be used to pick up or move items such as components in a manufacturing line or packages in a sorting or shipping warehouse. In other embodiments, the work cell device 125 may include other active devices or automated machines such as conveyance devices, labeling devices, and the like. Using tasks received from the orchestrator 105, the local controller 120 provides instructions to the work cell device 125 for performing a particular task. Using data returned from the device 125, the local controller 120 can determine whether the task was, or was not, completed successfully and report the results to the orchestrator 105. The work cell 130 can also include one or more sensors for detecting items in the work cell such as optical eyes, pressure sensors, or computing vision systems, but this is not a requirement.

Although FIG. 1 illustrates a one-to-one relationship between the local controller 120 and the work cell device 125, in other examples the local controller 120 can operate multiple work cell devices 125 (e.g., a one-to-many relationship). Moreover, the cloud 110 can contain multiple orchestrators (which is discussed in more detail in FIG. 2) which can be assigned to manage or control the work cell 130. However, in one embodiment, the work cell 130 can have a persistent connection to only one of the orchestrators. Stated differently, the work cell 130 can be owned or managed by only one of the orchestrators. Once established, the persistent connection is maintained as an open pipe for sending commands (action or information requests) and events (action results or sensor/state data) between the assigned orchestrator 105 and the local controller 120 in the work cell 130.

Figure 2:
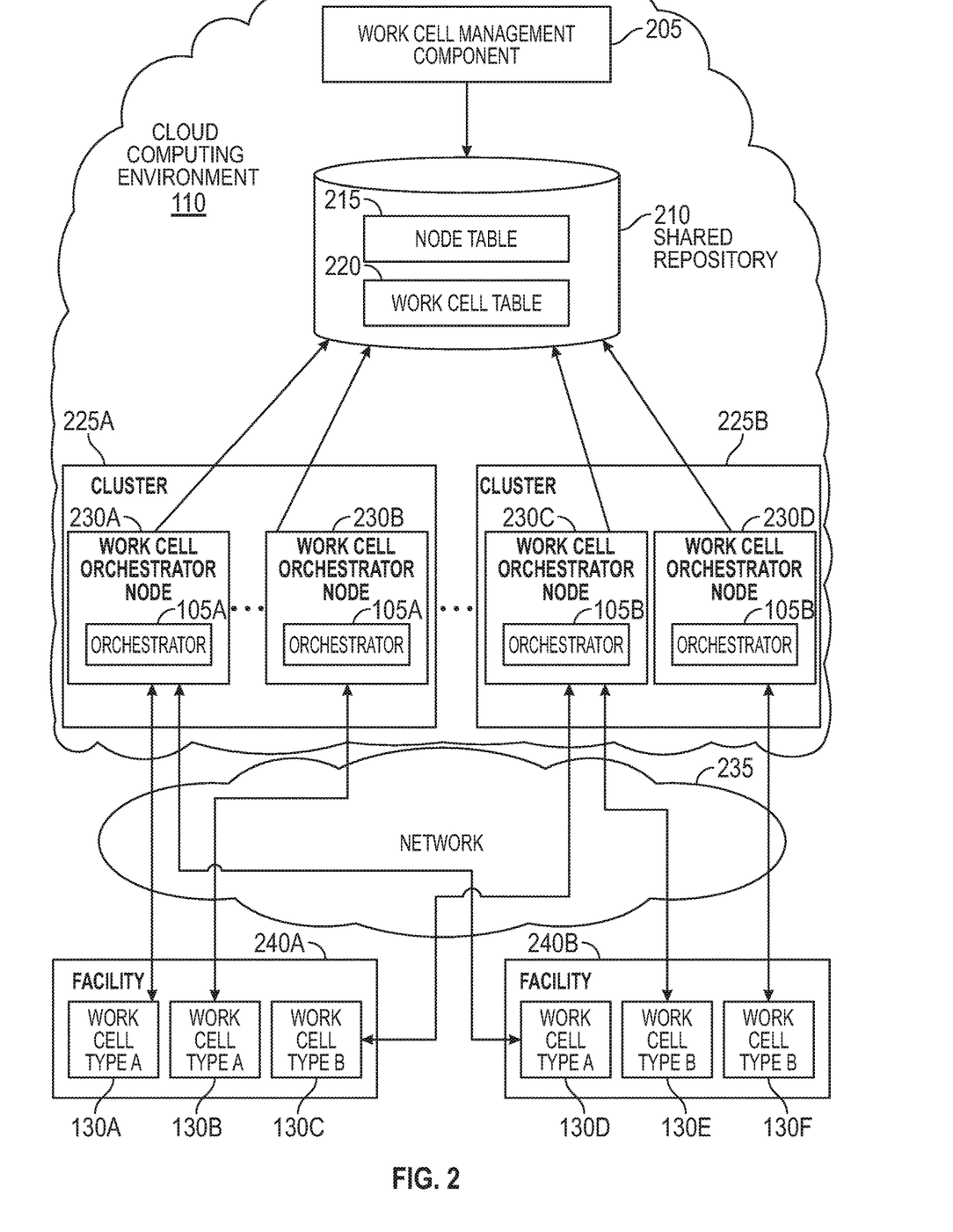
FIG. 2 is a block diagram of using clusters of work cell orchestrators to manage work cells, according to various embodiments.

FIG. 2 is a block diagram of using clusters 225 of work cell orchestrators 105 to manage work cells 130, according to various embodiments. Specifically, FIG. 2 illustrates that each cluster 225 includes a plurality of work cell orchestration nodes 230 which represent compute resources that host a respective orchestrator 105. The orchestration nodes 230 can be a portion of the compute resources in the cloud 110 such as one or more virtual machines (VMs).

In one embodiment, the orchestration nodes 230 are arranged in the clusters 225 according to the type of work cells that the nodes 230 can manage. For example, the orchestration nodes 230A and 230B in the cluster 225A both host an orchestrator 105A for managing a first type of work cells (i.e., type A work cells 130A, 130B, and 130D). In contrast, the orchestration nodes 230C and 230D in the cluster 225B both host an orchestrator 105B for managing a second type of work cells (i.e., type B work cells 130C, 130E, and 130F). For example, the orchestration nodes 230A and 230B in the cluster 225A may manage work cells with conveyor belts, while the orchestration nodes 230C and 230D in the cluster 225B manage work cells with robotic arms. In another example, the orchestrator 105A (e.g., a software application for orchestrating the work cells) that is hosted by the orchestration nodes 230A and 230B is a different or updated version of the orchestrator 105B hosted by the orchestration nodes 230C and 230D. In this example, the work cells 130 may be the same (e.g., contain the same automated machine or machines) but are managed by different clusters which have different software versions of the orchestrator 105.

The network 235 can be a public or private network that permits the orchestration nodes 230 to control or orchestrate the automated machines in the work cells 130. In one embodiment, the work cells 130 can be owned or controlled by only one of the orchestration nodes 230. The ownership of the work cells 130 is stored in a work cell table 220 in a shared repository 210. That is, each of the orchestration nodes 230 can access the data in the shared repository 210. In one embodiment, the work cell table 220 includes an entry for each of the work cells 130. Each of these entries can include a work cell ID that identifies the work cell, a cluster ID indicating which cluster 225 controls the work cell, a state indicating whether the work cell is ENABLED or DISABLED, a node ID indicated which orchestration node 230 in the assigned cluster 225 owns the work cell 130, and a heartbeat timestamp indicating the last time the entry was updated. By checking the cluster ID and the node ID in the entries in the work cell table 220, an orchestration node 230 can determine whether a work cell is owned by another one of the orchestration nodes 230.

The shared repository 210 also includes a node table 215 which stores entries for each of the orchestration nodes 230. These entries may store a Node ID which identifies the orchestration node 230 corresponding to the entry, a cluster ID indicating which cluster 225 contains the orchestration node 230, and heartbeat timestamp indicating the last time the entry was updated. In addition to the orchestration nodes 230, a work cell management component 205 can access and change the data stored in the node table 215 and the work cell table 220. For example, the work cell management component 205 may be responsible for adding new entries into the tables 215 and 220 when new orchestration nodes 230 and new work cells 130 are created. Moreover, the work cell management component 205 may migrate the work cells 130 from one cluster to another cluster. That is, the work cell management component 205 can force a work cell 130 owned by an orchestration node 230 in one of the clusters 225 to migrate to an orchestration node 230 in a different cluster. For example, the new assigned orchestration node 230 may have an updated version of the orchestrator 105 for controlling the work cell 130.

FIG. 2 also illustrates that a work cell orchestration node 230 can control work cells 130 in different facilities via the network 235. For example, the orchestration node 230A controls the work cell 130A in the facility 240A and the work cell 130D in the facility 240B. These facilities may be two different buildings on the same campus or may be located on opposite ends of the country. As such, the orchestration nodes 230 (and the hosted orchestrator 105) can control work cells that are in the same facility or different facilities which are located large distances from each other.

Figure 3:
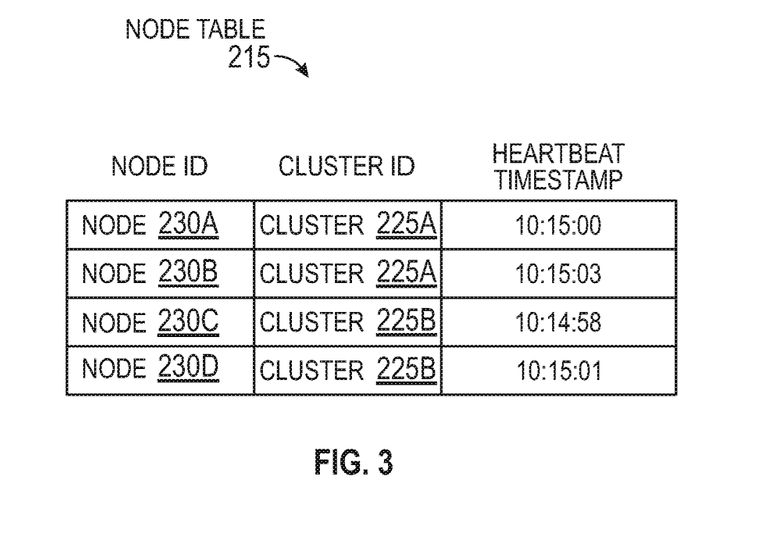
FIG. 3 illustrates an exemplary node table, according to various embodiments.

FIG. 3 illustrates an exemplary node table 215, according to various embodiments. The node table 215 has four entries which correspond to the four orchestration nodes 230 illustrated in FIG. 2. The node ID corresponds to the reference numbers of the nodes in FIG. 2 (e.g., nodes 230A-230D) and can be any unique number assigned by the management component 205. When an orchestration node 230 is added to a cluster, the management component can assign the node a unique ID (relative to the IDs assigned to the other orchestration nodes) and add an entry in the node table 215 for the new node 230.

The cluster ID indicates the particular cluster 225 that contains the orchestration node. In this example, the nodes 230 are divided among the clusters 225A and 225B. However, the control system may contain any number of clusters and each cluster can contain the same number, or a different number, of orchestration nodes 230. Like the orchestration nodes 230, the management component 205 can assign unique IDs to each cluster when forming the clusters.

In one embodiment, each orchestration node 230 updates the heartbeat timestamp in its corresponding entry in the node table 215 at a predefined interval—e.g., every ten seconds. Thus, by monitoring the heartbeat timestamp in the entries, the management component 205 (and the other orchestration nodes 230) can determine if a node 230 has failed. For example, if the heartbeat timestamp has not been updated in the last two update intervals (e.g., for more than twenty seconds), this indicates the corresponding orchestration node 230 is no longer functioning. For example, the orchestration node 230 may have experienced an error or is hung. In another example, the management component 205 may have disabled the orchestration node 230 in order to update its orchestrator 105. In this manner, the management component 205 and the orchestration nodes 230 can use the timestamps in the node table 215 to identify which orchestration nodes 230 are functional.

Figure 4:
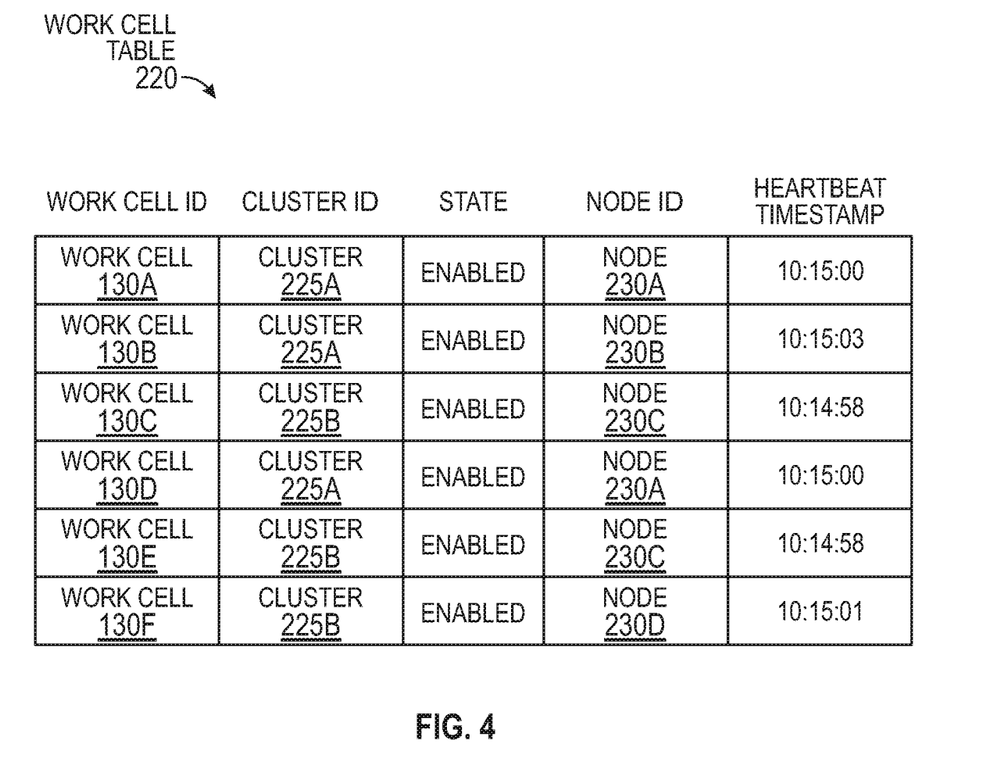
FIG. 4 illustrates an exemplary work cell table, according to various embodiments.

FIG. 4 illustrates an exemplary work cell table 220, according to various embodiments. The work cell table 220 has six entries which correspond to the six work cells 130 illustrated in FIG. 2. In this example, the work cell ID is the reference numbers illustrated in FIG. 2—i.e., 130A-130F. When a new work cell is discovered, the management component 205 can assign a unique ID to the work cell and add a new entry for the work cell in the table 220.

The cluster ID and the node ID indicates which cluster 225, and the orchestration node 230 in that cluster, that controls the work cell. When a work cell is first discovered by the management component 205 and added to the work cell table 220, the management component 205 may assign the work cell to the cluster which corresponds to its type. That is, the work cells of type A are assigned to the cluster 225A while the work cells of type B are assigned to the cluster 225B. In this manner, the management component 205 can populate the cluster ID value for each new entry. However, the node ID value may initially be blank or null. As described in detail below, the orchestration nodes 230 perform an assignment technique to assign newly added work cells to one of the nodes 230 in the cluster. That is, after the management component 205 assigns a work cell to a cluster, the orchestration nodes 230 can perform the assignment technique to determine which of the nodes 230 is assigned to control the work cell. Once performed, the node ID for the orchestration node 230 that now controls the work cell 130 is added to its entry in the work cell table 220.

Once assigned to a node 230, that node 230 periodically updates the heartbeat timestamp for the work cell in the work cell table 220. For example, every ten seconds the orchestration node 230 can update the heartbeat timestamp for each work cell under its control. Thus, any other orchestration node 230 in the control system can reference the work cell table 220 and determine, based on the node ID, which orchestration node owns the work cell and, based on the heartbeat timestamp, determine whether that node is still regularly updating the entry. If the heartbeat timestamp has not been updated in the last two update periods (e.g., more than twenty seconds), the orchestration node 230 can determine that the node 230 owning the work cell 130 has failed. The work cell 130 can then be assigned to a different orchestration node 230 as a part of an automatic failover process.

The state of the entries indicates whether the corresponding work cell is ENABLED or DISABLED. In FIG. 4, all of the work cells are enabled but may be disabled if there is a malfunction in the local controller or the work cell device in the work cell. Moreover, the management component 205 may disable a work cell as part of migrating the work cell to a different cluster.

Figure 5:
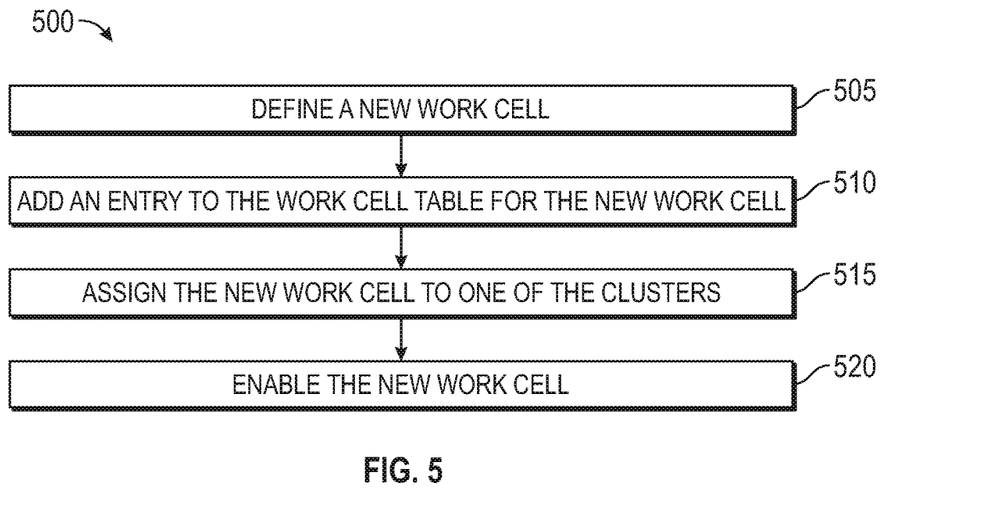
FIG. 5 is a flowchart for defining new work cells, according to various embodiments.

FIG. 5 is a flowchart of a method 500 for defining new work cells, according to various embodiments. At block 505, the management component defines a new work cell. For example, an engineer may provide information regarding the new work cell to the management component. After the engineer has assembled the work cell, she can provide information regarding the work cell to the management component such as the type of the work cell, its location in a facility, the work cell devices in the work cells, and the like. With this information, the management component can establish communication with the work cell.

In another embodiment, the management component identifies new work cells without human involvement. For example, when powered on and connected to the network, the local controller in a new work cell may contact the management component automatically. Using the local controller, the management component can determine the type of the work cell, the number of automated machines or devices in the work cell, and the like.

In one embodiment, the management component assigns a hostname and a port to the work cell which can be used by the assigned orchestration node (which may not have been selected yet) to establish communication with the work cell.

At block 510, the management component adds an entry to the work cell table for the new work cell. The management component also assigns or identifies a work cell ID for the work cell which is added to the new entry in order to link the work cell to the entry.

At block 515, the management component assigns the new work cell to one of the clusters. In one embodiment, the management component determines a type of the work cell which is then used to identify the cluster. That is, the control system may include multiple clusters which are each assigned to control a certain type of work cell. The management component can add the cluster ID of the corresponding cluster to the entry for the work cell in the work cell table.

At block 520, the management component enables the work cell. For example, when adding the new entry, the state of the work cell may initially be set to disabled. Once the work cell is assigned a hostname, a communication port, a cluster, and is ready to be assigned to one of the orchestration nodes, the management component changes the state to ENABLED which signals to the orchestration nodes the work cell is ready to be assigned. In another embodiment, the management component may not add the entry for the work cell until the work cell is ready to be assigned to an orchestration node. In that case, the state of the work cell may initially be set to ENABLED.

Figure 6:
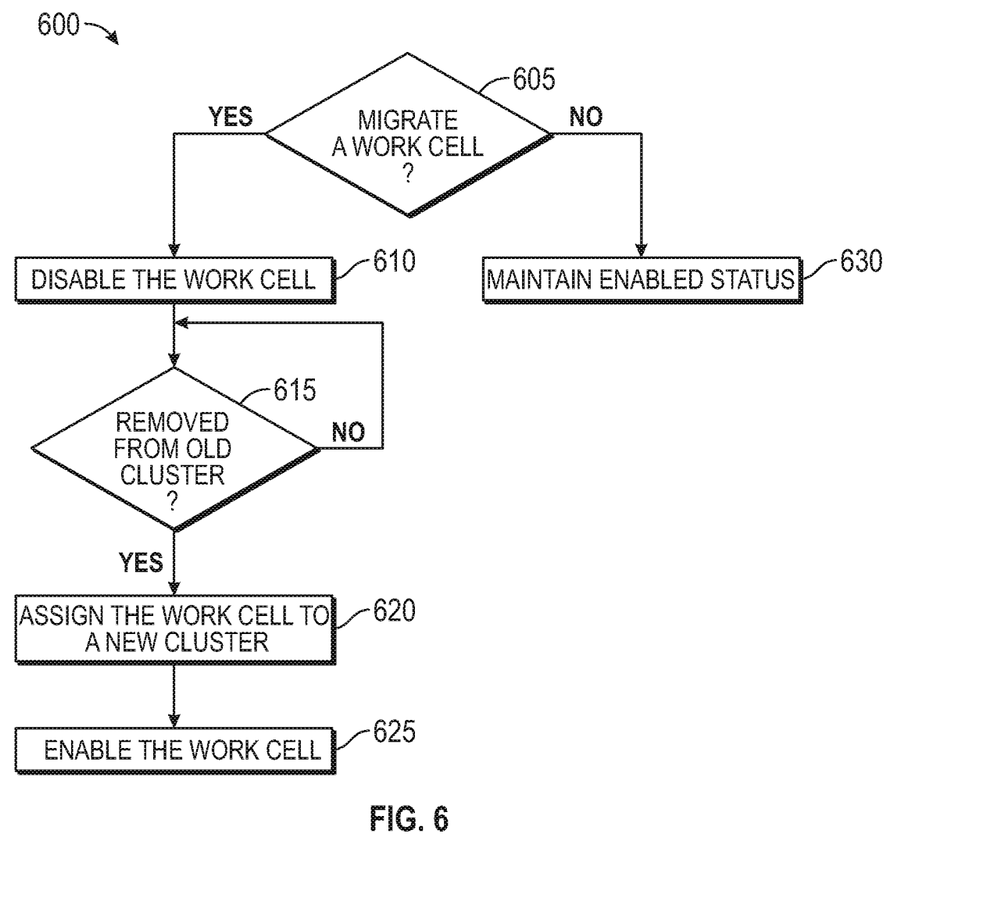
FIG. 6 is a flowchart for migrating a work cell between clusters of work cell orchestrators, according to various embodiments.

FIG. 6 is a flowchart of a method 600 for migrating a work cell between clusters of work cell orchestrators, according to various embodiments. At block 605, the management component determines whether to migrate a work cell to a different cluster. The management component may decide to migrate the work cell for any number of reasons such as the management component wants the work cell to be controlled by an updated version of an orchestrator which is contained in a different cluster, or the configuration of the work cell has been changed to include a different automated device (or a different version or upgrade of the same automated device) which is controlled using orchestration nodes in a different cluster.

If the management component determines not to migrate the work cell, at block 630 the management component maintains the ENABLED state of the work cell in the work cell table which indicates to the orchestration node currently controlling the work cell to continue doing so. However, if the management component determines to migrate the work cell, the method 600 proceeds to block 610 where the management component changes the state of the work cell in its corresponding entry in the work cell table from ENABLED to DISABLED. This indicates to the orchestration node that it should no longer control the work cell. The management component can disable the work cells individually or in groups on the old cluster. This provides a great deal of flexibility in the migration process to allow the timing of migrations to be coordinated with work cell or site specific requirements (such as timing of personnel breaks).

In one embodiment, each orchestration node maintains a work cell list that identifies all the work cells that the node is currently controlling. As mentioned above, at intervals the orchestration nodes can check the work cell table and update the heartbeat timestamps in entries of work cells assigned to it. While doing so, the orchestration node can check the status of the entries to determine if the management component has changed the status to disabled, and thus, the orchestration node should remove the work cell for its work cell list. However, in another embodiment, when disabling the work cell, the management component may check the work cell table and identify using the node ID the orchestration node currently assigned to the work cell. The management component can then proactively send a message to the identified orchestration node informing the node that the work cell has been disabled and should be removed from its work cell list. In this example, the work cell can be removed from the work cell list of the orchestration node without waiting for the orchestration node to check the work cell table.

In one embodiment, removing the work cell from the work cell list of the orchestration node currently assigned to control the work cell effectively removes the work cell from the cluster. Because the state of the work cell in the work cell table is disabled, none of the other orchestration nodes in the cluster will attempt to control the work cell. Put differently, although the orchestration node stops updating the heartbeat timestamp, disabling the work cell means the orchestration nodes in the cluster do not determine that the orchestration node has failed and that as part of the failover protocol the work cell should be reassigned to a different orchestration node in the cluster. Instead, the other orchestration nodes can determine the work cell is being migrated and should remain unassigned.

Once at block 615 the work cell has been removed from the old cluster, at block 620 the management component assigns the work cell to a new cluster. In one embodiment, the management component updates the cluster ID in the entry of the work cell in the work cell table.

At block 625, the management component enables the work cell. That is, the management component changes the state in the entry of the work cell table from DISABLED to ENABLED. Doing so indicates to the orchestration nodes in the new cluster that the work cell is ready to be assigned. This assignment process is discussed in more detail in FIG. 7.

Figure 7:
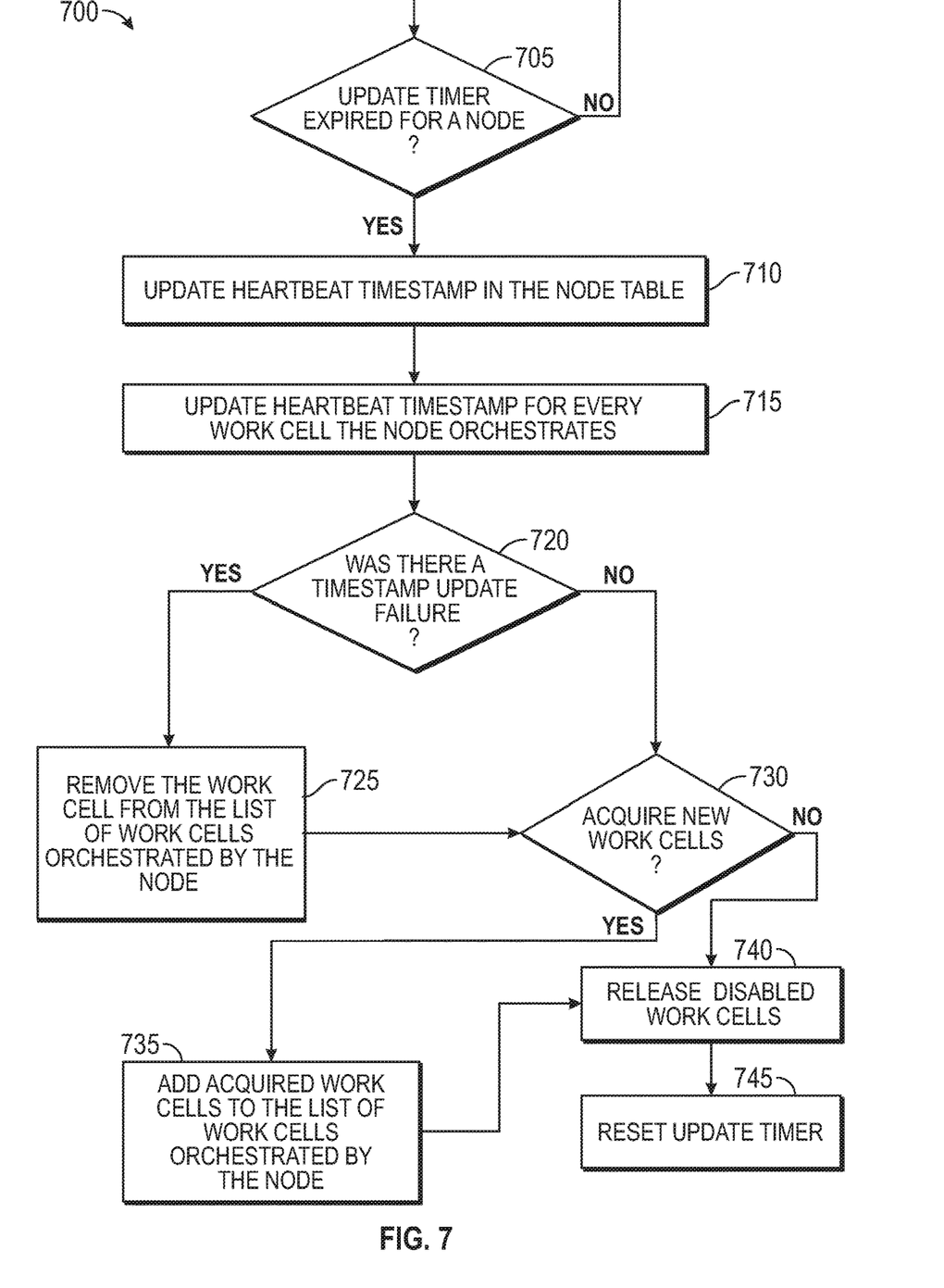
FIG. 7 is a flowchart for an orchestration node to assert ownership over current work cells and new work cells, according to various embodiments.

FIG. 7 is a flowchart of a method 700 for an orchestration node to assert ownership over current work cells and new work cells, according to various embodiments. In one embodiment, the method 700 is performed by each active orchestration node in the control system. That is, regardless of the assigned cluster, in one embodiment, each of the active and functional orchestration nodes in the clusters individually performs the method 700 for asserting ownership of current work cells and assigning new work cells. For clarity, the method 700 is discussed from the perspective of one of the orchestration nodes.

At block 705, the orchestration node determines whether its update timer has expired. That is, each orchestration node may maintain an update timer indicating when it is time for the orchestration node to perform the method 700. The update timers may have different values, and thus, the orchestration nodes may perform method 700 at different times. However, in one embodiment, the duration of the update interval (e.g., 10 seconds) is consistent across all orchestration nodes in the system (or at least within each cluster).

If the time has expired, the method 700 proceeds to block 710 where the orchestration node updates its heartbeat timestamp in the node table. That is, the orchestration node changes the value of the heartbeat timestamp in its corresponding entry in the node table to the current time according to a common clock such as a clock on the shared repository 210 or according to synchronized clocks on the orchestration nodes. Doing so indicates to the other orchestration nodes that the node is functional and has recently updated the work cell table (as described below in later blocks). Moreover, the orchestration node currently performing the method 700 can scan the heartbeat timestamps for the other entries and identify if a timestamp has not been updated recently—e.g., within two update intervals. This can indicate the corresponding orchestration node is non-functional or is disabled which can be used when assigning new work cells.

At block 715, the orchestration node updates heartbeat timestamps for every work cell that it orchestrates. That is, the orchestration node can scan the work cell table and identify each entry that has its node ID (and the same cluster ID). The orchestration node then updates the heartbeat timestamps in those entries to the current time according to the common clock. In one embodiment, this heartbeat timestamp update is performed in a manner such that the update succeeds only when the node ID in the work cell table matches its own node ID and the cluster ID in the work cell table matches its cluster ID. This permits the orchestration node to assert ownership over the corresponding work cells. That is, other orchestration nodes scanning the entries can see the recently updated timestamp and know that the currently assigned orchestration node is actively controlling the work cell.

In one embodiment, the orchestration node uses its work cell list to also determine whether to update the heartbeat timestamp for an entry. As mentioned above, the orchestration nodes can each maintain a local work cell list indicating the work cells the node controls. The orchestration node may compare the work cell IDs in that list with the work cell IDs in the entries in the work cell to make sure there is a match before updating the timestamps. For example, the orchestration node may determine that a work cell listed in its work cell list now has a node ID corresponding to a different orchestration node. As such, the orchestration node determines that work cell has been reassigned to a different node and removes the work cell from its work cell list—i.e., determines it no longer owns the work cell and should not update its heartbeat timestamp at block 715.

In another embodiment, the orchestration node may remove work cells from its work cell list if the orchestration node is having problems communicating with, or controlling, the work cell. Thus, the work cell may still have the ID for the orchestration node in its entry in the work cell table, but because the orchestration node is unable to orchestrate the work cell, at block 715 the orchestration node does not update the heartbeat timestamp for the work cell even though the entry for the work cell in the work cell table may still contain the ID for the orchestration node. Put differently, the orchestration nodes permits the heartbeat timestamp entry for the work cell to go stale which, as discussed later, permits another orchestration node to attempt to acquire the work cell in a failover protocol.

At block 720, the orchestration node determines whether there was a timestamp update failure. That is, the orchestration node may have lost the work cell to another orchestration node when attempting to update the heartbeat timestamps in the work cell table. For example, the orchestrator in the orchestration node may have recently failed and was restarted. In the meantime, the timestamp for the work cells assigned to the orchestration node were not updated. Using the failover protocol (described below), the work cell may have been removed from orchestration node. For example, because the method 700 may be performed in parallel by multiple orchestration nodes, while the orchestration node is attempting to update the heartbeat timestamps for the work cells it orchestrates at block 715, other orchestration nodes in the cluster may simultaneously (or immediately prior) update the work cell table to acquire or assert ownership of the work cells (because these work cells have stale heartbeat timestamps). If another orchestration node successfully changes the node ID to its node ID for the work cells that were previously owned by the orchestration node, when the orchestration node attempts to update the heartbeat timestamps of its entries in parallel, the shared repository indicates that the timestamp was not updated. This failure indication indicates to the orchestration node it no longer is assigned those work cells. In another example, the management component may remove the work cell from the table or assign the work cell to another cluster ID. In this case, the attempt to update the timestamp by the node fails since the work cell is no longer present in the work cell table or now has a cluster ID different than that of the node. This also can indicate to the orchestration node that it no longer is assigned to orchestrate that work cell.

In another example, assuming the node ID in the entries in the work cell table have been changed, the orchestration node may compare the work cell IDs in its work cell list to determine whether the corresponding entries in the work cell table still indicate the node owns the work cell. For example, the work cell list may indicate that the orchestration node owns Work Cell A, B, and C. However, the entries in the work cell table for those work cells may now have node IDs for different orchestration nodes. In this manner, the orchestration node can determine which previously owned work cells have been removed from its control.

If there is an update failure (or the orchestration node determines a work cell has been removed from its control), the method 700 proceeds to block 725 where the orchestration node removes the work cell (or cells) from the list of work cells orchestrated by the node. Using the previous example, if the entries for Work Cells A and B now have different node IDs or the orchestration node was unable to update the timestamps for these work cells, the orchestration node removes these work cells from its list which now only contains Work Cell C.

If there is not an update failure and the orchestration node maintains control over the same work cells, the method 700 skips block 725 and proceeds to block 730 where the orchestration node determines whether to acquire new work cells. One exemplary technique for acquiring new work cells is described in detail in FIG. 8 below.

Assuming the orchestration node determines to acquire at least one new work cell, the method 700 proceeds to block 735 where the node adds the acquired work cells to the list of work cells orchestrated by the node. Using the updated work cell list, the orchestrator in the orchestration node can send commands to the local controllers in those work cells to control the work cell devices.

At block 740, the orchestration node releases disabled work cells. The node can identify disabled work cells by evaluating the entries in the work cell table that were updated at block 715. That is, while updating the timestamps, the orchestration node can check the state of the entry to determine if it has been changed from ENABLED to DISABLED. For example, the management component may have decided to migrate the work cell, or an engineer may want to perform maintenance or upgrade the local controller or work cell device in an work cell assigned to the orchestration node. In any case, the orchestrator can perform a controlled work cell orchestration shutdown process and explicitly release the work cell. As part of this shutdown process, the orchestration node may set the node ID and heartbeat timestamp in the entry for the work cell to NULL thereby indicating to the other nodes that the orchestration node no longer owns the work cell.

At block 745, the orchestration node resets its update timer according to a predefined update interval (e.g., five second, ten seconds, one minutes, etc.). The method 700 can then return to block 705 where the orchestration node waits until the update time again expires before repeating the method 700.

Figure 8:
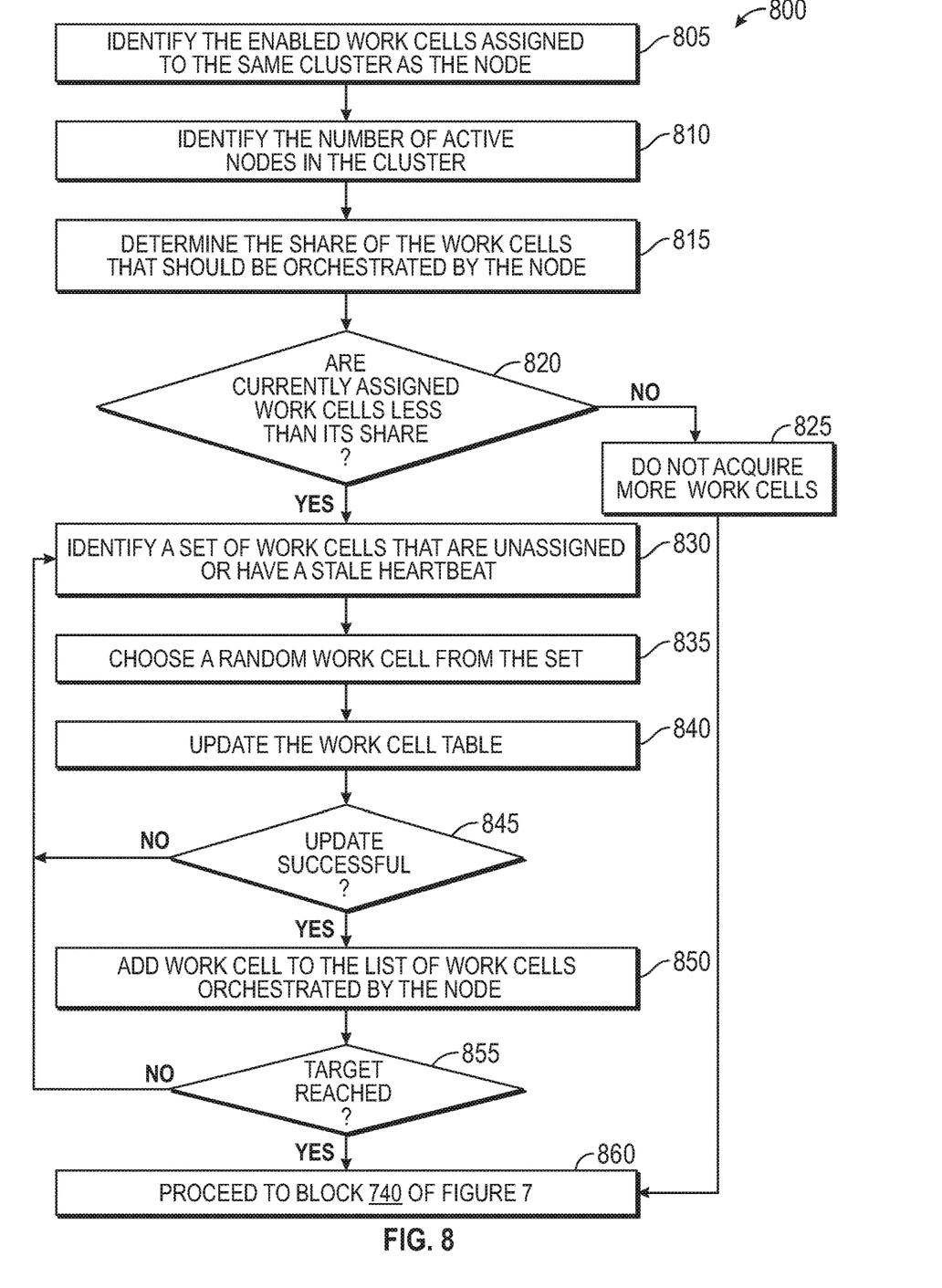
FIG. 8 is a flowchart for an orchestration node to acquire new work cells, according to various embodiments.

FIG. 8 is a flowchart of a method 800 for an orchestration node to acquire new work cells, according to various embodiments. The new work cells can be work cells that were recently added to the control system with new entries in the work cell table, or can be previously assigned work cells that are reassigned to a different orchestration node as part of an automatic failure protocol. In one embodiment, the method 800 begins after block 720 or 725 of the method 700 and corresponds to block 730 where the orchestration node determines whether to acquire any new work cells.

At block 805, the orchestration node identifies the enabled work cells assigned to the same cluster as the node. Put differently, the orchestration node searches the work cell table to identify the entries that store a cluster ID that matches the cluster containing the orchestration node and that have a state of ENABLED. This excludes entries for work cells that are controlled by nodes in different clusters or have been disabled by the management component.

At block 810, the orchestration node identifies the number of active orchestration nodes in the cluster. For example, the cluster may include four orchestration nodes (including the orchestration node performing the method 800). However, one of those orchestration nodes may have faulted and thus, is inactive. In that case, the cluster would contain three active orchestration nodes.

At block 815, the orchestration node determines the share of the work cells that it should orchestrate. In one embodiment, the orchestration node divides the total number of enabled work cells assigned to the same cluster as determined at block 805 by the number of active nodes determined at block 810. For example, if there are 300 total enabled work cells assigned to the cluster and three orchestration nodes, each orchestration node has a share or target of orchestrating 100 assigned work cells. Although in this example, the target distribution is the same among the orchestration nodes, in other examples, one orchestration node may have a higher target than the other orchestration nodes in the cluster—e.g., the node may have more assigned compute resources. Regardless of the target distribution among orchestration nodes, in one embodiment, the sum of the targets across all active nodes is at least as great as the number of currently active work cells (in order to assure that all work cells get assigned to an orchestration node). For example, for equal distribution across orchestration nodes, this could be achieved by rounding up the division of the number of enable work cells assigned to the cluster by the number of active nodes assigned to the cluster to the next higher integer value.

At block 820, the orchestration node determines whether the number of currently assigned work cells is less that its share or target. Continuing the previous example, the orchestration node may currently orchestrate 97 work cells but has a target of 100 work cells. In that case, the orchestration node has less that its share of work cells and the method 800 proceeds to block 830 where the orchestration node identifies a set of work cells that are unassigned or have a stale heartbeat timestamp. That is, the orchestration node searches the work cell table to identify all the work cells assigned to the same cluster that may be new (e.g., just added to the work cell table by the management component) or were previously assigned to an orchestration node that has failed. Thus, the orchestration node can identify the work cells that are new to the cluster as well as work cells that should be reassigned as part of the failover protocol which occurs once the heartbeat timestamp becomes stale.

Although not shown in the method 800, if performing block 830 results in an empty set, then the method 800 can proceed to block 825 where the orchestration node does not acquire more work cells. However, assuming there is at least one work cell in the cluster that should be assigned, the method proceeds to block 835 where the orchestration node chooses a random work cell from the set identified at block 830. At block 840, the orchestration node attempts to update the entry for the randomly selected work cell in the work cell table. Put differently, the orchestration node attempts to assert ownership of the work cell. In one embodiment, the orchestration node sends a request to the shared repository to change the node ID for the entry of the work cell to its ID and update the heartbeat timestamp to the current timestamp. Further, when sending the request to the shared repository, the orchestration node may also ensure the work cell is still in an ENABLED state and the node ID is null or has a stale timestamp and that the cluster ID still matches that of the orchestration node. Because multiple orchestration nodes in the same cluster can perform the method 800 in parallel, the nodes may compete with each other—i.e., attempt to acquire the same nodes in parallel. Thus, when attempting to assert ownership, the orchestration node can double check to make sure the node ID is still null and the timestamp has not been updated which would indicate another orchestration node has already asserted ownership of the work cell in the time that elapsed between block 830 where the node determined the set of work cells, and when the node attempts to asserts ownership of one of the work cells in that set at block 840. Transactional functionality which may be inherent in the shared repository 210 can be employed to determine whether an orchestration node has successfully acquired ownership of a work cell in an atomic update without requiring the orchestration node to explicitly double check the work cell table.

At block 845, the orchestration node determines whether the update was successful. If the shared repository indicates that the update failed (e.g., another orchestration node has asserted ownership), the method 800 returns to block 830 where the orchestration node again identifies the set of work cells that are unassigned or have a stale heartbeat timestamp (since the previous set may now be outdated). However, instead of generating a new set, in another embodiment the method 800 returns to block 835 and randomly selects a different work cell from the previously generated set (again assuming the set includes more than one work cell). As stated previously, when no more work cells in the cluster are available for assignment, the method 800 can proceed to block 825 where the orchestration node does not acquire more work cells.

If the update was successful, the orchestration node now owns the work cell and the method 800 proceeds to block 850 where the node adds the work cell to the list of work cells orchestrated by the node. That is, the work cell ID is added to the local work cell list maintained at the orchestration node that indicates to the orchestrator which work cells it is assigned to control. In one embodiment, the local controller for each work cell is perpetually awaiting new connection requests from the orchestration nodes, regardless of whether the local controller already holds an active connection with another orchestration node. When sending a new connection request once the orchestration node asserts ownership of the work cell at block 850, these requests are authenticated by local controller, and once authenticated, are accepted as the active orchestration connection for the work cell. Any previously active orchestration connection is forcefully terminated by the work cell when a new connection is accepted—e.g., a previous connection to an orchestration node that has failed. This last-in-wins policy acknowledges the system-level design that any authorized connection request emanating from an orchestrator node represents the currently authorized orchestrator for this work cell (as enforced by the distributed work cell assignment algorithm described in the method 800 and the shared repository).

At block 855, the orchestration node determines whether its target is reached. In other words, the node determines whether it now controls its fair share of the enabled work cells in the cluster as determined at block 815. If yes, the method proceeds to block 740 of FIG. 7. If no, the method 800 returns to block 830 where a new set of work cells is generated and the loop can repeat until block 830 returns an empty set or the orchestration node reaches its target.

The control system illustrated in FIG. 2 can be scaled by adding new orchestration nodes to the clusters. This can be performed by a human operator or automatically based on the number of work cells being orchestrated by each node exceeding a threshold. When an orchestration node is added, the node adds a new entry to the node table and can then begin to acquire new work cells using the techniques described in FIGS. 7 and 8. To expedite the balancing of the workload to the new orchestration node, individual work cells from other orchestration nodes in the cluster can be explicitly disabled and then re-enabled after shutdown is complete. Using the method 800, the new orchestration node automatically has precedence in acquiring the re-enabled work cells.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the work cell orchestrator) or related data available in the cloud. For example, the orchestrator could execute on a computing system in the cloud and provide tasks to the work cell. In such a case, the orchestrator could issue tasks to multiple work cells and store the results of performing those tasks at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system comprising:
    a plurality of work cells each comprising a local controller and an automated machine;
    a first cluster comprising a first plurality of orchestration nodes, each comprising a first cloud-based orchestrator communicatively coupled to at least one of the plurality of work cells via a network, wherein the first plurality of orchestration nodes is configured to orchestrate a first type of the plurality of work cells; and
    a second cluster comprising a second plurality of orchestration nodes, each comprising a second cloud-based orchestrator communicatively coupled to at least one of the plurality of work cells via the network, wherein the second plurality of orchestration nodes is configured to orchestrate a second type of the plurality of work cells different from the first type,
    wherein each of the first plurality of orchestration nodes is configured to, at a predefined interval:
        identify enabled work cells of the first type of the plurality of work cells assigned to the first cluster;
        identify a number of active orchestration nodes of the first plurality of orchestration nodes;
        determine a target number of the enabled work cells that should be orchestrated by each of the first plurality of orchestration nodes;
        identify a set of the enabled work cells that are at least one of unassigned to one of the first plurality of orchestration nodes or have stale timestamps;
        update a work cell table to inform the other orchestration nodes of the first plurality of orchestration nodes that a selected one of the enabled work cells in the set has a new owner;
        establish a new connection to the local controller of the selected one of the enabled work cells;
        determine that the target number has not yet been reached;
        identify a different set of enabled work cells that are at least one of unassigned to one of the first plurality of orchestration nodes or have stale timestamps; and
        update the work cell table to inform the other orchestration nodes of the first plurality of orchestration nodes that a selected one of the enabled work cells in the different set has a new owner.

2. The system of claim 1, further comprising:
    a first facility; and
    a second facility, wherein the first type and the second type of the plurality of work cells are distributed in both the first and second facilities.

3. The system of claim 1, further comprising:
    a cloud computing environment comprising the first cluster, the second cluster, and a shared repository accessible by the first and second pluralities of orchestration nodes, wherein the shared repository contains the work cell table.

4. The system of claim 1, wherein each of the first plurality of orchestration nodes is configured to:
    determine that updating the work cell table to assert ownership of the selected one of the enabled work cells in the set has failed;
    identify a second different set of the enabled work cells that are at least one of unassigned to one of the first plurality of orchestration nodes or have stale timestamps; and
    update the work cell table to inform the other orchestration nodes of the first plurality of orchestration nodes that a selected one of the enabled work cells in the second different set has a new owner.

5. A method performed by a first orchestration node, the method comprising:
    identifying enabled work cells of a plurality of work cells assigned to a cluster, wherein the cluster comprises a plurality of orchestration nodes that includes the first orchestration node, wherein each of the plurality of work cells comprises a work cell device controllable by one of the plurality of orchestration nodes to perform a function;
    determining a desired target number of the enabled work cells that should be orchestrated by the first orchestration node based on a number of the enabled work cells;
    identifying a set of the enabled work cells that are at least one of unassigned to one of the plurality of orchestration nodes or have stale timestamps;
    determining that a number of currently assigned work cells to the first orchestration node is less than the desired target number;
    updating a work cell table to assert ownership of the selected one of the enabled work cells in the set, wherein the work cell table is accessible by the plurality of orchestration nodes; and establishing a new connection to a local controller of the selected one of the enabled work cells in the set.

6. The method of claim 5, further comprising:
adding the selected one of the enabled work cells to a work cell list in the first orchestration node, wherein the work cell list indicates which of the plurality of work cells are currently owned by the first orchestration node.

7. The method of claim 5, wherein updating the work cell table comprises:
changing a node ID in an entry in the work cell table corresponding to the selected one of the enabled work cells to an ID of the first orchestration node; and
updating a heartbeat timestamp in the entry.

8. The method of claim 5, further comprising:
repeating the method at a predefined interval using an update timer.

9. The method of claim 8, further comprising:
updating, each time the method is repeated, a heartbeat timestamp in an entry corresponding to the first orchestration node in a node table, wherein the node table contains an entry for each of the plurality of orchestration nodes, wherein each entry in the node table contains a respective heartbeat timestamp corresponding to a respective one of the plurality of orchestration nodes.

10. The method of claim 8, further comprising:
updating, each time the method is repeated, a heartbeat timestamp in each entry of the work cell table that corresponds to a work cell currently owned by the first orchestration node.

11. The method of claim 10, further comprising:
receiving a failure indication from a shared repository containing the work cell table when updating the heartbeat timestamp, the failure indication indicating the first orchestrator node no longer owns the work cell corresponding to the heartbeat timestamp; and
removing an ID of the work cell from a work cell list maintained at the first orchestration node.

12. The method of claim 5, wherein each of the plurality of work cells comprises a respective local controller that can communicate with only one of the plurality of orchestration nodes at any given time, and wherein the work cell device is an automated machine.

13. The method of claim 5, further comprising:
determining that the desired target number has not yet been reached;
identifying a different set of enabled work cells that are at least one of unassigned to one of the first plurality of orchestration nodes or have stale timestamps; and
updating the work cell table to inform the other orchestration nodes of the plurality of orchestration nodes that a selected one of the enabled work cells in the different set has a new owner.

14. A computer-readable storage medium comprising computer-readable program code embodied therewith, the computer-readable program code executable by a processor to perform an operation, the operation comprising:
identifying enabled work cells of a plurality of work cells assigned to a first cluster, wherein the first cluster comprises a plurality of orchestration nodes that includes a first orchestration node, wherein each of the plurality of work cells includes a work cell device controllable by one of the plurality of orchestration nodes to perform a function;
determining a desired target number of the enabled work cells that should be orchestrated by the first orchestration node based on a number of the enabled work cells;
identifying a set of the enabled work cells that are at least one of unassigned to one of the plurality of orchestration nodes or have stale timestamps;
determining that a number of currently assigned work cells to the first orchestration node is less than the desired target number;
updating a work cell table to assert ownership of a selected one of the enabled work cells in the set, wherein the work cell table is accessible by the plurality of orchestration nodes; and
establishing a new connection to a local controller of the selected one of the enabled work cells in the set.

15. The computer-readable storage medium of claim 14, wherein the operation further comprises:
adding the selected one of the enabled work cells to a work cell list in the first orchestration node, wherein the work cell list indicates which of the plurality of work cells are currently owned by the first orchestration node.

16. The computer-readable storage medium of claim 14, wherein updating the work cell table comprises:
changing a node ID in an entry in the work cell table corresponding to the selected one of the enabled work cells to an ID of the first orchestration node; and
updating a heartbeat timestamp in the entry.

17. The computer-readable storage medium of claim 14, wherein the operation further comprises:
updating, each time the operation is repeated, a heartbeat timestamp in an entry corresponding to the first orchestration node in a node table, wherein the node table comprises an entry for each of the plurality of orchestration nodes, wherein each entry in the node table contains a respective heartbeat timestamp corresponding to a respective one of the plurality of orchestration nodes.

18. The computer-readable storage medium of claim 14, wherein the operation further comprises:
updating, each time the operation is repeated, a heartbeat timestamp in each entry of the work cell table that corresponds to a work cell currently owned by the first orchestration node.

19. The computer-readable storage medium of claim 18, wherein the operation further comprises:
receiving an failure indication from a shared repository containing the work cell table when updating the heartbeat timestamp, the failure indication indicating the first orchestrator node no longer owns the work cell corresponding to the heartbeat timestamp; and
removing an ID of the work cell from a work cell list maintained at the first orchestration node.

* * * * *

UNITED STATES PATENT AND TRADEMARK OFFICE
CERTIFICATE OF CORRECTION

PATENT NO. : 10,761,520 B1
APPLICATION NO. : 15/950624
DATED : September 1, 2020
INVENTOR(S) : Stephen Boone et al.

Page 1 of 1

It is certified that error appears in the above-identified patent and that said Letters Patent is hereby corrected as shown below:

In the Claims

In Column 17, Line 49, in Claim 13, after "the" delete "first".

Signed and Sealed this
Twenty-seventh Day of October, 2020

Andrei Iancu
*Director of the United States Patent and Trademark Office*